United States Patent [19]
Hunter

[11] 4,430,481
[45] Feb. 7, 1984

[54] SECONDARY RECOVERY METHOD
[75] Inventor: Walter D. Hunter, Houston, Tex.
[73] Assignee: Texaco Development Corp., White Plains, N.Y.
[21] Appl. No.: 374,203
[22] Filed: May 3, 1982
[51] Int. Cl.³ .............................................. C08F 8/36
[52] U.S. Cl. .......................... 525/328.4; 252/8.55 D; 526/304
[58] Field of Search ............... 525/328.4, 326.8, 329.4; 526/304

[56] References Cited
U.S. PATENT DOCUMENTS
3,277,056 10/1966 Coleman .............................. 526/304
3,578,637  5/1971 Coleman .............................. 526/304
4,297,226 10/1981 Hunter ............................. 525/329.4

Primary Examiner—Paul R. Michl
Attorney, Agent, or Firm—Carl G. Ries; Jack H. Park; Walter D. Hunter

[57] ABSTRACT

Hydrocarbons are recovered from a subterranean hydrocarbon-bearing formation penetrated by an injection well and a production well by displacing hydrocarbons toward the production well using a drive fluid such as water or brine, thickened with a copolymer of acrylamide and diacetone acrylamide alkoxylated with an alkylene oxide or glycidol, optionally sulfated or sulfonated. If desired, said drive fluid can be saturated with carbon dioxide, nitrogen, natural gas or mixtures of these gases at the injection pressure.

7 Claims, No Drawings

SECONDARY RECOVERY METHOD

BACKGROUND OF THE INVENTION

1. Field of the Invention

This invention relates to a method for recovering hydrocarbons from a subterranean hydrocarbon-bearing formation penetrated by an injection well and a production well wherein a drive fluid such as water or brine thickened with a water-soluble polymer of acrylamide and diacetone acrylamide, alkoxylated with an alkylene oxide or glycidol, and optionally sulfated or sulfonated is used to displace hydrocarbons in the formation toward a production well.

2. Prior Art

The production of petroleum products is usually accomplished by drilling into a hydrocarbon-bearing formation and utilizing one of the well-known recovery methods for the recovery of hydrocarbons. However, it is recognized that these primary recovery techniques may recover only a minor portion of the petroleum products present in the formation particularly when applied to reservoirs of viscous crudes. Even the use of improved recovery practices involving heating, miscible flooding, water flooding and steam processing may still leave up to 70–80 percent of the original hydrocarbons in place.

Thus, many large reserves of petroleum fluids from which only small recoveries have been realized by present commercial recovery methods, are yet to reach a potential recovery approaching their estimated oil-in-place.

Water flooding is one of the more widely practiced secondary recovery methods. A successful water flood may result in recovery of 30–50 percent of the original hydrocarbons left in place. However, generally the application of water flooding to many crudes results in much lower recoveries.

The newer development in recovery methods for heavy crudes is the use of steam injection which has been applied in several modifications, including the "push-pull" technique and through-put methods, and has resulted in significant recoveries in some areas. Crude recovery of this process is enhanced through the beneficial effects of the drastic viscosity reduction that accompanies an increase in temperature. This reduction in viscosity facilitates the production of hydrocarbons since it improves their mobility, i.e., it increases their ability to flow.

However, the application of these secondary recovery techniques to depleted formations may leave major quantities of oil-in-place, since the crude is tightly bound to the sand particles of the formation, that is, the sorptive capacity of the sand for the crude is great. In addition, interfacial tension between the immiscible phases results in entrapping crude in the pores, thereby reducing recovery. Another disadvantage is the tendency of the aqueous drive fluid to finger, since its viscosity is considerably less than that of the crude, thereby reducing the efficiency of the processes. Another disadvantage is the tendency of the aqueous drive fluid to remove additional gas by diffusion from the in-place oil thus further reducing the already lowered formation oil volume and increasing the viscosity of the oil.

A number of processes have been disclosed in the art in which an aqueous drive fluid containing a polymeric thickening agent is employed. For example, in U.S. Pat. No. 3,900,069 an aqueous drive fluid utilizing as a thickening agent an acrylamide-diacetone acrylamide copolymer is disclosed. Such polymers, although useful, suffer from a number of disadvantages. One disadvantage is that the solubility of these expensive copolymers in aqueous fluids is usually limited.

There is a definite need in the art for a water flooding process in which the disadvantages discussed above are largely eliminated or avoided.

SUMMARY OF THE INVENTION

This invention relates to a method for recovering hydrocarbons from a subterranean hydrocarbon-bearing formation penetrated by an injection well and a production well which comprises:

(a) injecting into the formation via an injection well a drive fluid comprising water or brine having dissolved therein a small amount of a copolymer of acrylamide and diacetone acrylamide alkoxylated with an alkylene oxide such as ethylene oxide or a mixture of ethylene oxide and propylene oxide wherein the weight percent of ethylene oxide in the said mixture is from about 60 to 95, or glycidol, i.e. 2, 3 epoxy-1-propanol, (b) forcing the said fluid through the formation and (c) recovering hydrocarbons through the production well.

In another embodiment of this invention the drive fluid may comprise water or brine having dissolved therein a small amount, i.e., about 0.01 to about 5.0 weight percent or more of a sulfated, alkoxylated copolymer of acrylamide and diacetone acrylamide.

In a further embodiment of this invention the drive fluid may comprise water or brine having dissolved therein a small amount, i.e., about 0.01 to 5.0 weight percent or more of a sulfonated, alkoxylated copolymer of acrylamide and diacetone acrylamide.

An additional embodiment of this invention relates to the drive fluid compositions utilized in step (a) which be saturated with carbon dioxide, nitrogen or natural gas, or mixtures thereof if desired.

DETAILED DESCRIPTION OF THE INVENTION

Prior to practicing the method of this invention it is sometimes desirable to open up a communication path through the formation by a hydraulic fracturing operation. Hydraulic fracturing is a well-known technique for establishing a communication path between an injection well and a production well. Fracturing is usually accomplished by forcing a liquid such as water, oil or any other suitable hydrocarbon fraction into the formation at pressure of from about 300 to about 3000 psig which is sufficient to rupture the formation and to open up channels therein. By use of this method it is possible to position the fracture at any desired vertical location with respect to the bottom of the oil-filled zone. It is not essential that the fracture planes be horizontally oriented, although it is, of course, preferable. After the fracture has been established, and without diminishing the fracture pressure, a propping agent may be injected into the fraction in order to prevent healing of the fracture which would destroy its usefulness for fluid flow communication purposes. Gravel, metal shot, glass beads, sand, etc. and mixtures thereof are generally employed as propping agents. When sand is utilized as the propping agent particles having a Tyler mesh size of from about 8 to about 40 are preferred (i.e., from about 0.016 to about 0.093 inches).

The copolymers of acrylamide and diacetone acrylamide utilized in preparing the alkoxylated copolymers employed in this invention comprise recurring acrylamide units of the formula:

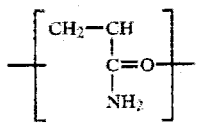

and recurring diacetone acrylamide units of the formula:

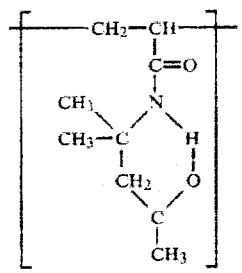

In the said copolymer the weight percent of acrylamide units ranges from about 60 to about 95 with balance being diacetone acrylamide units.

Although the diacetone acrylamide units have been shown as ring structures, it should be understood that the diacetone group may actually be a linear chain since the binding between the keto oxygen and the hydrogen atom is relatively weak. Generally, the number average molecular weight of the acrylamide-diacetone acrylamide copolymers will range from about 50,000 to about 20,000,000 or more and preferably from about 1,000,000 to about 8,000,000. The water-soluble copolymers of acrylamide-diacetone acrylamide are known materials which can be prepared by the usual vinyl compound polymerization methods. The preparation of acrylamide-diacetone acrylamide polymers is described in detail in Sarem U.S. Pat. No. 3,900,069 which is incorporated herein in its entirety by reference.

For example, the preparation of the acrylamide-diacetone acrylamide copolymers can be conducted by charging an aqueous solution containing about 30 weight percent reactant monomers to an autoclave, removing air by purging with nitrogen and then initiating the polymerization reaction by adding a suitable catalyst such as triethyl boron in a solvent which can be dioxane in an amount of about 25 parts of boron per million parts of monomer. Preferably the polymerization is carried out with agitation and at a temperature below about 60° C. After about 24 hours or more a viscous gelatinous water-soluble copolymer product is obtained.

The alkoxylated copolymers of acrylamide and diacetone acrylamide employed in the process of this invention comprise the copolymer alkoxylated with from about 2 to about 150 percent or more by weight of ethylene oxide, a mixture of ethylene oxide and propylene oxide wherein the weight percent of ethylene oxide in the said mixture is about 60 to about 95 or glycidol. A particular advantage of these copolymers is that they dissolve readily in aqueous fluids.

The alkoxylation of the acrylamide-diacetone acrylamide copolymers can be conveniently conducted using methods well known in the art. For example, an aqueous solution of the copolymer comprising about 10 to about 35 weight percent or more of the copolymer in water along with about 0.5 weight percent or more of powdered potassium hydroxide or sodium hydroxide is charged to an autoclave and the autoclave and contents heated to a temperature of about 125° to about 200° C. after which the required weight of ethylene oxide, for example, is pressured with nitrogen into the autoclave over a period of 1 to about 3 hours or more following which the autoclave is allowed to cool to room temperature and then vented. The reaction product remaining after being stripped yields the water-soluble, alkoxylated copolymer.

The alkoxylation of the acrylamide-diacetone acrylamide copolymer can also be conducted by reacting the alkylene oxide with the copolymer dispersed, for example, in xylene.

A number of other methods are set out in the art for conducting such alkoxylation reactions including those described in U.S. Pat. Nos. 2,213,477; 2,233,381; 2,131,142; 3,879,475; 2,174,761; 2,425,845 and 3,062,747 which are incorporated herein by reference.

When the copolymer of acrylamide and diacetone acrylamide is reacted with an alkylene oxide where the alkylene group has from 2 to 4 inclusive carbon atoms and includes, for example, ethylene oxide, propylene oxide and mixtures thereof and glycidol, in the presence of sodium or potassium hydroxide the reaction is one which takes place with one or more of the active hydrogen atoms attached to the nitrogen atoms present in the copolymer which results in the formation of an alkoxylated copolymer, i.e., an N-substituted, water-soluble copolymer bearing N-substituents having the formula:

—(RO)$_d$H wherein R is alkylene or hydroxyalkylene of from 2 to 4 inclusive carbon atoms and d is an integer of at least 1.

The water-soluble, sulfated, alkoxylated acrylamide-diacetone acrylamide copolymers useful in the drive fluids of this invention are N-substituted copolymers having number average molecular weights of about 50,000 to about 10,000,000 or more bearing N-substituents, for example, having the formula

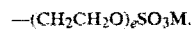
—(CH$_2$CH$_2$O)$_e$SO$_3$M.

wherein e is an integer of from 1 to 6 and M is selected from the group consisting of hydrogen, sodium, potassium or ammonium. Generally in the water-soluble, sulfated, alkoxylated acrylamide-diacetone acrylamide copolymers, the weight percent of the N-substituents will range from about 5 to about 50 or more. These water-soluble sulfated copolymers can be prepared according to known methods from, for example, ethoxylated acrylamide-diacetone acrylamide copolymers, i.e., copolymers bearing N-substituents of the formula:

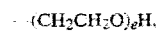
—(CH$_2$CH$_2$O)$_e$H, wherein e is an integer of from 1 to 6, and having a number average molecular weight of about 50,000 to about 10,000,000 or more with sulfuric acid, chlorosulfonic acid, sulfur trioxide, oleum or any other suitable sulfating agent. The corresponding sodium, potassium or ammonium derivative of these water-soluble, sulfated, ethoxylated polyacrylamides can be formed by neutralization with the corresponding alkali metal hydroxide or ammonium hydroxide. The preparation of such sulfated materials is more completely described in U.S. Pat. Nos. 3,508,612; 3,827,497 which are incorporated herein in their entirety by reference.

The water-soluble, sulfonated, alkoxylated acrylamide-diacetone acrylamide copolymers useful in the drive fluids of this invention are N-substituted copolymers having number average molecular weights of about 50,000 to about 10,000,000 or more bearing N-substituents having, for example, the formula:

$$-(CH_2CH_2O)_fCH_2CH_2SO_3M,$$

wherein f is an integer of from 1 to 5 and M is selected from the group consisting of hydrogen, sodium, potassium or ammonium. Generally in the water-soluble, sulfonated, alkoxylated acrylamide-diacetone acrylamide copolymers, the weight percent of the N-substitutents will range from about 5 to about 50 or more. These water-soluble, sulfonated, alkoxylated copolymers of this invention can be prepared according to known methods by first reacting, for example, an ethoxylated acrylamide-diacetone copolymer, i.e., a copolymer bearing N-substituents of the formula:

$$-(CH_2CH_2O)_eH,$$

wherein e is an integer of from 1 to 6, and having a number average molecular weight of about 50,000 to about 10,000,000 or more with sulfuric acid or any other suitable sulfating agent to form a sulfated, alkoxylated, acrylamide-diacetone acrylamide copolymer bearing N-substituents of the formula:

$$-(CH_2CH_2O)_eSO_3H,$$

wherein e is an integer of from 1 to 6. The above-described sulfated, ethoxylated acrylamide-diacetone acrylamide copolymer can be converted to the sulfonate by procedures known in the art such as by reaction with sodium sulfite at an elevated temperature, i.e., about 150° to 185° C. for about 5 to 10 hours or more. The corresponding sodium, potassium or ammonium derivative of these water-soluble, sulfonated, alkoxylated acrylamide-diacetone acrylamide copolymers can be formed by neutralization with the corresponding alkali metal hydroxide or ammonium hydroxide.

Other useful sulfated or sulfonated alkoxylated acrylamide-diacetone acrylamide copolymers where the alkoxylating agent is a mixture of ethylene oxide and propyleneoxide or is glycidol can be prepared in the same manner as described above for the preparation of the sulfated or sulfonated ethoxylated copolymers.

If desired, the aqueous drive fluids having dissolved therein the above-described polymeric thickening agents may be made alkaline by addition of an alkaline agent. The advantageous results achieved with the aqueous alkaline medium used in the process of this invention are believed to be derived from the wetability improving characteristics of the alkaline agent.

Useful alkaline agents include compounds selected from the group consisting of alkali metal hydroxides, alkaline earth metal hydroxides, and the basic salts of the alkali metal or alkaline earth metals which are capable of hydrolyzing in an aqueous medium to give an alkaline solution. The concentration of the alkaline agent employed in the drive fluid is generally from about 0.005 to about 0.3 weight percent. Also, alkaline materials such as sodium hypochlorite are highly effective as alkaline agents. Examples of these especially useful alkaline agents include sodium hydroxide, potassium hydroxide, lithium hydroxide, ammonium hydroxide, sodium hypochlorite, potassium hypochlorite, sodium carbonate and potassium carbonate.

The following example which illustrates the preparation of the alkoxylated acrylamide-diacetone acrylamide copolymer is to be considered not limitative.

EXAMPLE I

A total of 500 cc of water, 5 g. of powdered potassium hydroxide and 70 g. of an acrylamide-diacetone acrylamide copolymer (number average molecular weight of about 2,500,000) are added to an autoclave which is then heated to a temperature of 120° C. In the starting terpolymer the weight percent of acrylamide units is about 80 with the balance being diacetone acrylamide units. Ethylene oxide in the amount of 37 g. is added to the autoclave under nitrogen pressure over a 1.1 hour period during which time the temperature of the autoclave is maintained at 125°. Next, the autoclave and contents are allowed to cool to room temperature after which the autoclave is vented. The reaction mixture is then stripped of volatiles using a nitrogen purge. The resulting water-soluble product is a copolymer of acrylamide and diacetone acrylamide alkoxylated with about 23 weight percent of ethylene oxide.

In the secondary recovery process of this invention, generally the aqueous drive fluid will contain from about 0.01 to about 0.5 weight percent or more of the alkoxylated acrylamide-diacetone acrylamide copolymer. Optionally, the aqueous drive fluid may be saturated with carbon dioxide, nitrogen and/or natural gas at the injection pressure which generally will be from about 300 to about 3500 psig or more.

If desired, the aqueous drive fluid having dissolved therein one of the above-described polymeric thickening agent may be made alkaline by addition of an alkaline agent. The advantageous results achieved with the aqueous alkaline medium used in the process of this invention are believed to be derived from the wettability improving characteristics of the alkaline agent.

Useful alkaline agents include compounds selected from the group consisting of alkali metal hydroxides, alkaline earth metal hydroxides, and the basic salts of the alkali metal or alkaline earth metals which are capable of hydrolyzing in an aqueous medium to give an alkaline solution. The concentration of the alkaline agent employed in the drive fluid is generally from about 0.01 to about 0.3 weight percent. Also, alkaline materials such as sodium hypochlorite are highly effective as alkaline agents. Examples of these especially useful alkaline agents include sodium hydroxide, potassium hydroxide, lithium hydroxide, ammonium hydroxide, sodium hypochlorite, potassium hypochlorite, sodium carbonate and potassium carbonate.

EXAMPLE II

In a field in which the primary production has already been exhausted, an injection well is completed in the hydrocarbon-bearing formation and perforations are formed between the interval of 5100–5130 feet. A production well is drilled approximately 450 feet distance from the injection well, and perforations are similarly made in the same hydrocarbon-bearing formation at 5105-5135 feet.

The hydrocarbon-bearing formation in both the injection well and the production well is hydraulically fractured using conventional techniques, and a gravel-sand mixture is injected into the fracture to hold it open and prevent healing of the fracture.

Next, water to which there has been added about 0.18 weight percent sodium hydroxide and containing dissolved therein 0.30 weight percent of an acrylamide-diacetone acrylamide copolymer having a number average molecular weight of about 2,000,000, alkoxylated with about 15 weight percent of ethylene oxide in the manner previously described in Example I above is injected via the injection well into the formation at a pressure of 2100 psig and at the rate of 1.2 barrels per minute. In the acrylamide-diacetone acrylamide copolymer the weight percent of the acrylamide units is about 84 with the balance being diacetone acrylamide units. Injection of the drive fluid is continued at the rate of about 1.2 barrels per minute and at the end of 64 days the rate of production of oil via the production well is substantially greater than with water injection alone.

EXAMPLE III

In a field in which the primary production has already been exhausted, an injection well is completed in the hydrocarbon-bearing formation and perforations are formed between the interval of 6150-6170 feet. A production well is drilled approximately 430 feet distance from the injection well, and perforations are similarly made in the same hydrocarbon-bearing formation at 6155-6175 feet.

The hydrocarbon-bearing formation in both the injection well and the production well is hydraulically fractured using conventional techniques, and a gravel-sand mixture is injected into the fracture to hold it open and prevent healing of the fracture.

Water saturated with carbon dioxide at 1100 psig at a temperature of 70° F. and containing dissolved therein copolymer bearing about 25 weight percent of N-substituents of the formula:

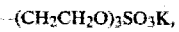
—(CH$_2$CH$_2$O)$_3$SO$_3$K, is injected via the injection well into the formation at a pressure of about 1100 psig and at the rate of 1.06 barrels per minute. The sulfated ethoxylated acrylamide-diacetone acrylamide copolymer being prepared as described above by first ethoxylating an acrylamide-diacetone acrylamide copolymer having a number average molecular weight of about 1,200,000 and consisting of about 81 weight percent acrylamide units with the balance being diacetone acrylamide units and then sulfating the resulting ethoxylated copolymer. Injection of the driving fluid is continued at the rate of about 1.06 barrels per minute and at the end of 75 days the rate of production of oil is substantially greater than with water injection alone.

EXAMPLE IV

An injection well is completed in the hydrocarbon-bearing formation in a field in which the primary production has already been exhausted and perforations are formed between the interval of 4190 and 5020 feet. A production well is drilled approximately 455 feet distance from the injection well, and perforations are similarly made in the same hydrocarbon-bearing formation at 4190-5020 feet.

In both the injection well and the production well the hydrocarbon-bearing formation is hydraulically fractured using conventional methods.

Next, water at a temperature of 70° F. saturated with nitrogen at a pressure of about 1260 psig containing dissolved therein 1.10 weight percent of an acrylamide-diacetone acrylamide copolymer having a number average molecular weight of about 2,300,000; alkoxylated in the manners previously described in Example I above, with about 12 weight percent of glycidol is injected via the injection well into the formation at a pressure of about 1260 psig and at a rate of about 1.1 barrels/minute. In the acrylamide-diacetone acrylamide copolymer, the weight percent of the acrylamide units is 76, with the balance being acrylamide diacetone units. Injection of the drive fluid is continued at the rate of 1.1 barrels/minute and at the end of 65 days the production of oil via the production well is substantially greater than with water injection above.

EXAMPLE V

In a field in which the primary production has already been exhausted, an injection well is completed in the hydrocarbon-bearing formation and perforations are formed between the interval of 4550-4580 feet. A production well is drilled approximately 425 feet distance from the injection well, and perforations are similarly made in the same hydrocarbon-bearing formation at 4550-4580 feet.

The hydrocarbon-bearing formation in both the injection well and the production well is hydraulically fractured using conventional techniques, and a gravel-sand mixture is injected into the fracture to hold open and prevent healing of the fracture.

Next, brine to which there has been added about 0.15 weight percent sodium hydroxide and containing dissolved therein 0.47 weight percent of an sulfonated, ethoxylated acrylamide acid-diacetone acrylamide copolymer bearing about 14 weight percent of N-substituents of the formula.

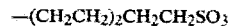
—(CH$_2$CH$_2$)$_2$CH$_2$CH$_2$SO$_3$ is injected via the injection well into the formation at a pressure of 1200 psig and at the rate of 1.3 barrels per minute. The sulfonated, ethoxylated acrylamide-diacetone acrylamide copolymer being prepared as previously described by first ethoxylating an acrylamide-diacetone acrylamide copolymer having a number average molecular weight of about 1,750,000 and consisting of about 65 weight percent acrylamide units with the balance being diacetone acrylamide and then sulfating the resulting ethoxylated copolymer and finally converting the sulfated ethoxylated copolymer to the sulfonated ethoxylated copolymer.

Injection of the drive fluid is continued at the rate of about 1.3 barrels per minute and at the end of 61 days the rate of production of oil is substantially greater than with water injection alone.

What is claimed is:

1. An N-substituted sulfated, ethoxylated acrylamide-diacetone acrylamide copolymer bearing N-substituents of the formula:

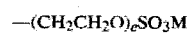
—(CH$_2$CH$_2$O)$_c$SO$_3$M wherein e is an integer of from 1 to 6 and M is selected from the group consisting of hydrogen, sodium, potassium and ammonium.

2. The copolymer of claim 1 wherein the number average molecular weight of the said copolymer is from about 50,000 to about 10,000,000.

3. An N-substituted sulfonated, ethoxylated acrylamide-diacetone acrylamide copolymer bearing N-substitutents of the formula:

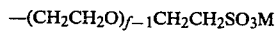

$-(CH_2CH_2O)_{f-1}CH_2CH_2SO_3M$ wherein f is an integer of from 1 to 5 and M is selected from the group consisting of hydrogen, sodium, potassium or ammonium.

4. The copolymer of claim 3 wherein the number average molecular weight of said copolymer is from about 50,000 to about 10,000,000.

5. A copolymer of acrylamide and diacetone acrylamide alkoxylated with a material selected from the group consisting of:
(a) ethylene oxide
(b) a mixture of ethylene oxide and propylene oxide, and
(c) glycidol.

6. The copolymer of claim 5 wherein the number average molecular weight of the acrylamide-diacetone acrylamide copolymer is about 50,000 to about 20,000,000.

7. The copolymer of claim 5 wherein the said acrylamide-diacetone acrylamide copolymer is alkoxylated with from about 2 to about 150 weight percent of the said material.

* * * * *